United States Patent [19]
O'Brien et al.

[11] Patent Number: 5,333,728
[45] Date of Patent: Aug. 2, 1994

[54] COMPACT DISC JACKET AND BLANK THEREFOR

[75] Inventors: Patrick J. O'Brien, Hackensack, N.J.; Ronald W. Womack, Fullerton, Calif.

[73] Assignee: Ivy Hill Corporation, New York, N.Y.

[21] Appl. No.: 113,984

[22] Filed: Aug. 30, 1993

[51] Int. Cl.⁵ ............................................. B65D 85/57
[52] U.S. Cl. ...................................... 206/232; 206/312
[58] Field of Search ...................... 206/303, 307—313, 206/387, 444, 472, 232; 229/68 R, 72

[56] References Cited

U.S. PATENT DOCUMENTS

| | | | |
|---|---|---|---|
| 3,556,391 | 1/1971 | Kosterka | 206/312 |
| 3,717,297 | 2/1973 | Perry | 206/312 |
| 4,401,257 | 8/1983 | Benham | 229/72 |
| 4,890,728 | 1/1990 | Grimsley | 229/72 |
| 4,905,831 | 3/1990 | Bagdis | 206/313 |
| 5,248,032 | 9/1993 | Sheu et al. | 206/312 |

FOREIGN PATENT DOCUMENTS

| | | | |
|---|---|---|---|
| 2141998 | 1/1985 | United Kingdom | 206/444 |
| 2219573 | 12/1989 | United Kingdom | 206/309 |

*Primary Examiner*—Jimmy G. Foster
*Attorney, Agent, or Firm*—Amster, Rothstein & Ebenstein

[57] ABSTRACT

A double-walled paperboard jacket for a compact disc and the like includes a front panel, a back panel, a front inner liner panel, a back inner liner panel, and a pair of glue flaps. One of the front panel ends is contiguous and folded relative to one of the back panel ends, the front inner liner panel is contiguous to and folded relative to the other end of the back panel. Each of the glue flaps is contiguous to and folded relative to a respective side of the front panel, and each of the glue flaps is glued to the back panel. The front, back and front inner liner panels are of generally the same configuration and dimensions, and the back inner liner panel and the pair of glue flaps are cooperatively configured and dimensioned to define a composite back inner liner panel of generally the same configuration and dimensions as the other panels.

32 Claims, 6 Drawing Sheets

COMPACT DISC JACKET AND BLANK THEREFOR

BACKGROUND OF THE INVENTION

The present invention relates to a compact disc jacket and, more particularly, to a double-walled paperboard jacket for a compact disc and the like as well as a blank from which the same may be made.

Compact discs are now used for a wide variety of different applications ranging from the original application for storing digitally recorded music to its more recent application as a Read-Only Memory (ROM) for computers. The original conventional storage device for the compact disc was a rigid all-plastic box known as a "jewel box." The jewel box has recently been criticized by environmentalists as being nonrecyclable and therefore ecologically unsound. Additionally, the jewel box itself was typically not printable and therefore had to be transparent in order to enable printed matter identifying the nature of the compact disc (perhaps the name of the album recorded, the performers, and the like) to be disposed inside the jewel box in such a way as to be visible therethrough. The jewel box was a rather bulky storage device for home use in view of the thinness of the compact disc being stored, and was not well suited for mailing since it was relatively brittle and therefore had to be protected by cushioning to prevent its fracture during rough handling in the mails.

More recently, compact discs have been sold in storage devices made of paperboard and plastic, this being more ecologically acceptable. Nonetheless, even in these newer storage devices, the paperboard component extending over the plastic holder had to be displaced to permit the compact disc (disposed in a horizontal plane) to be dropped onto the plastic component of the holder.

Compact discs have also been stored in an all-paperboard jacket having a hollow or chamber into which the compact disc was slid edgewise, much as a conventional record is slid into its paperboard sleeve. While such a paperboard jacket had the advantages of being totally recyclable, inexpensive, lightweight, easily mailable, and easily printable, in practice the jackets were not entirely satisfactory. Frequently the jackets were not of double-wall thickness on both sides of the compact disc, so that the jacket lacked the stiffness necessary to protect the surfaces of the compact disc within. Further, typically at least one of the two walls of the jacket did not present to the compact disc a smooth and essentially uninterrupted surface, but rather contained inwardly projecting elements which could interfere with the easy insertion of the compact disc into the hollow or chamber of the jacket. Finally, whereas conventional records played by a needle are necessarily constructed of material having sufficient strength to withstand the "aggressive" or scratchy nature of the uncoated interior of a conventional sleeve, the compact discs are made of softer material (since they are read by a light beam and not by a needle) and therefore less able to withstand the aggressive nature of an uncoated jacket interior. (The term "coating" refers to the "mill coating" of paperboard with clay and binder at the paper mill to improve the fine printability of the paperboard by improving the ink and coating holdout. The term "coating" may also refer to a "press applied coating" of varnish or aqueous latex, which is applied by a printer over printed paperboard in order to seal in the ink layer defining the printing.) It will be appreciated by those skilled in the art that while a compact disc is made of a softer material than the conventional record, its material is still strong enough to withstand the aggressive nature of an uncoated jacket interior. However, the perception of the public is such that there remains a preference for a coated jacket interior even though there may be no scientific advantage to providing the same.

A further disadvantage of the paperboard jacket of the prior art was its failure to provide a third panel (in addition to the front/front liner and back/back liner panel) which could receive therein a booklet or other printed matter relating perhaps to the subject matter of the CD, the artist, instructions on how to use the CD, or simply advertising matter of a related or unrelated nature.

Accordingly, it is an object of the present invention to provide a jacket for compact discs and the like which is substantially double-walled throughout for stiffness.

Another object is to provide such a jacket which presents a chamber or hollow with an essentially smooth interior to prevent hang-up of a compact disc therein during the insertion and removal processes.

Yet another object is to provide such a jacket which is 100% recyclable, inexpensive, lightweight, mailable without cushioning, and printable on its exterior surfaces.

A further object is to provide a paperboard blank, which is coated on only one side thereof, from which such a jacket may be made.

It is also an object of the invention to provide such a jacket which presents a chamber or hollow for a CD where the chamber or hollow has an interior formed only of coated material.

It is another object to provide such a jacket which includes a third panel defining a pocket for releasable storage of a booklet or like printed matter.

SUMMARY OF THE INVENTION

It has now been found that the above and related objects of the present invention are obtained in a blank for a double-walled paperboard jacket for a compact disc. The blank comprises a front panel and a back panel, each having a pair of opposed sides and a pair of opposed ends. One of the front panel ends is contiguous to one of the back panel ends. The blank also comprises a front inner liner panel contiguous to one of the opposed sides of the front panel, and a back inner liner panel contiguous to the other of the opposed ends of the back panel. Finally, the blank comprises a pair of glue flaps, each of the glue flaps being contiguous to an opposed side of the front panel. The front, back and front inner liner panels are of generally the same configuration and dimensions, and the back inner liner panel and the pair of glue flaps are cooperatively configured and dimensioned to define a composite back inner liner panel of generally the same configuration and dimensions as the other panels when the panels and glue flaps are appropriately folded relative to one another and the glue flaps are glued to the back panel.

Preferably the blank is coated for printing on only one face thereof, and the back inner liner panel has an H-shaped configuration defining a pair of opposed cutouts, one cutout being on one side thereof and adjacent said one side of the back panel and the other cutout being on the other side thereof.

In a first preferred embodiment, the blank includes an additional panel contiguous to the other of the opposed ends of the back panel and having a pair of opposed sides and a pair of opposed ends. A pair of extension flaps are provided for the additional panel, each of the extension flaps being contiguous to an opposed side of the additional panel. When the extension flaps are appropriately folded and secured relative to one another, forming a composite extension panel, each of the composite extension panel and the additional panel are of generally the same configuration and dimensions as the front, back and front inner panel. The additional panel and the composite extension panel are cooperatively configured and dimensioned to releasably receive an insert.

In a second preferred embodiment of the blank, the front, back, front inner liner, and back inner liner panels are of generally the same configuration and dimensions, and the pair of glue flaps are cooperatively configured and dimensioned to be appropriately folded relative to the front panel and glued to the exposed surface of the back panel to define a chamber intermediate the front inner liner and back inner liner panels adapted to receive a CD. Preferably, the blank is coated for printing or printed and coated on only one face thereof, and all interior surfaces of the chamber are defined by the one face.

The invention also encompasses a double-walled paperboard jacket for a compact disc made from such a blank. The jacket comprises front and back panels, each having a pair of opposed sides and a pair of opposed ends. One of the front panel ends is contiguous to and folded relative to one of the back panel ends. A front inner liner panel is contiguous to and folded relative to one of the opposed sides of the front panel, and a back inner liner panel is contiguous to and folded relative to one of the opposed sides of the back panel. Each of a pair of glue flaps is contiguous to and folded relative to an opposed side of the front panel, each of the glue flaps also being glued to the back panel. The front, back and front inner liner panels are of generally the same configuration and dimensions, and the back inner liner panel and the pair of glue flaps are cooperatively configured and dimensioned to define a composite back inner liner panel of generally the same configuration and dimensions as the other panels.

Preferably the jacket is formed substantially exclusively of paperboard and defines a chamber intermediate the front inner liner panel and the composite back inner liner panel. The sides of the jacket are closed by the fold between each of the glue flaps and the front panel, one of the ends of the jacket is closed by the fold between the front and back panels, and the other of the ends of the jacket defines an aperture for passage of a compact disc and the like therethrough into or from the chamber. Each of the panels defines a pair of opposed faces, one face of the front inner liner panel being glued to an adjacent face of the front panel, and one face of the back inner liner panel being glued to an adjacent face of the back panel. Each of the glue flaps is glued to the adjacent face of the back panel on an opposite side of the back inner liner panel. The back inner liner panel has an H-shaped configuration defining a pair of opposed cutouts, one cutout being on one side thereof and adjacent said one side of the back panel and the other cutout being on the other side thereof.

Preferably, the jacket is double-walled substantially throughout and is formed from a paperboard blank coated or printed and coated on only one surface thereof, all exterior surfaces of the jacket and substantially all interior surfaces of the chamber being coated. More particularly, all of the interior surfaces of the chamber defined by the front panel and the back inner liner panel are coated. All of the panels and glue flaps are together of one-piece, unitary, integral construction.

In a first preferred embodiment, the jacket includes an additional panel contiguous to the other of the opposed ends of the back panel and having a pair of opposed sides and a pair of opposed ends. A pair of extension flaps are provided for the additional panel, each of the extension flaps being contiguous to an opposed side of the additional panel. The extension flaps together form a composite extension panel, each of the composite extension panel and the additional panel being of generally the same configuration and dimensions as the front, back and front inner panel. The additional panel and the composite extension panel are cooperatively configured and dimensioned to releasably receive an insert.

In a second preferred embodiment of the jacket, the front, back, front inner liner and back inner liner panels are of generally the same configuration and dimensions, and the back panel has the glue panels on one of the opposed faces thereof and the back inner liner panel on the other of the opposed faces. The jacket is formed from a paperboard blank coated or printed and coated on only one surface thereof, and all exterior surfaces of the jacket and all interior surfaces of the chamber are coated.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
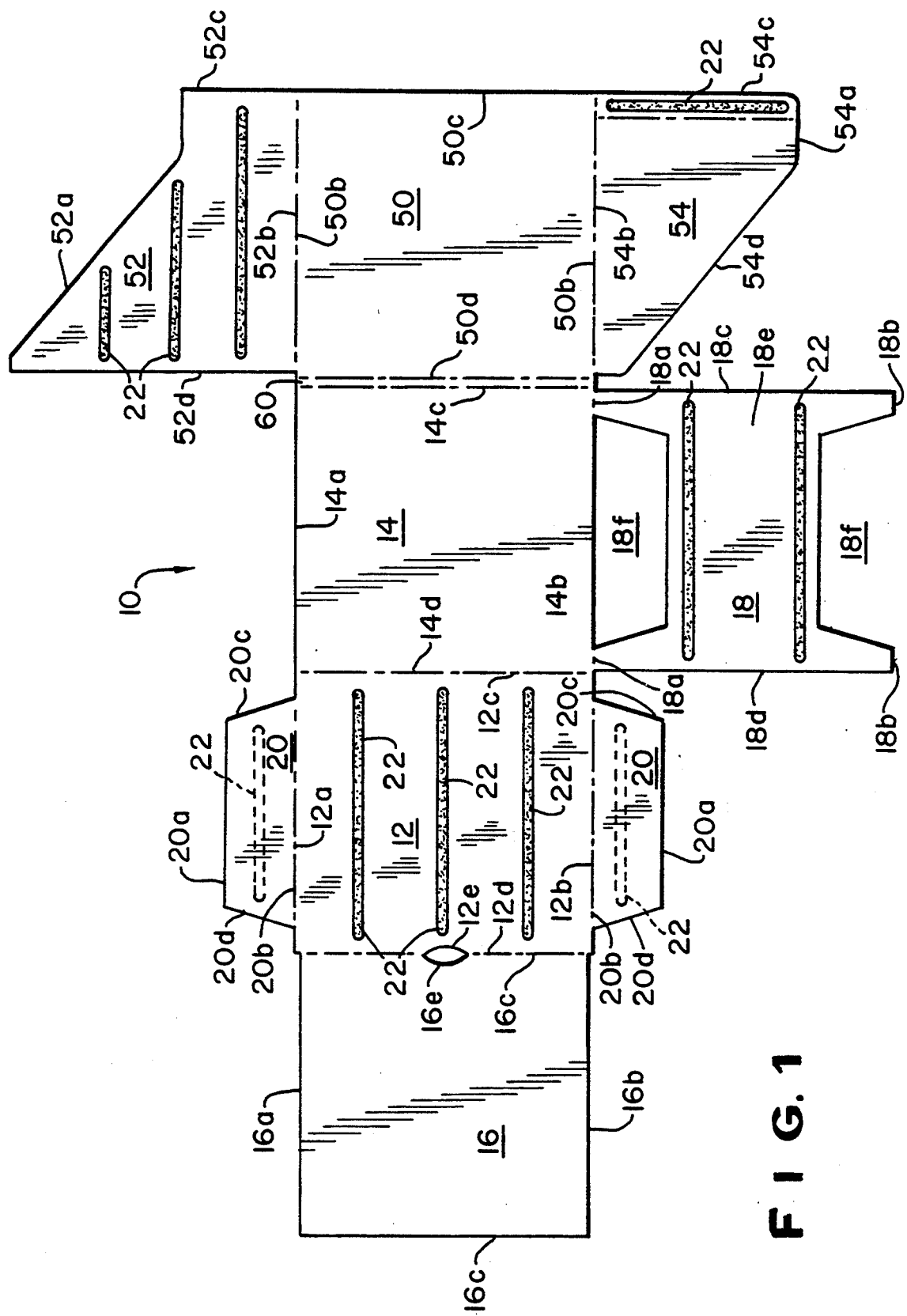
FIG. 1 is a front elevational view of a blank according to the present invention.

Referring now to the drawing and in particular to FIG. 1 thereof, therein illustrated is a paperboard blank according to the present invention, generally designated by the reference numeral 10. The blank 10 comprises a front panel 12 having a pair of opposed lateral sides 12a, 12b and a pair of opposed transverse ends 12c, 12d, and a back panel 14 having a pair of opposed sides 14a, 14b and a pair of opposed ends 14c, 14d. The front panel end 12c is contiguous to the back panel end 14d, the two ends 12c, 14d actually defining a foldline 12c, 14d between the front and back panels 12, 14. A front inner liner panel 16 has a pair of opposed sides 16a, 16b and a pair of opposed ends 16c, 16d, with the front inner liner panel end 16c being contiguous to the front panel end 12d, the ends 12d, 16c defining a fold line 12d, 16c. A back inner liner panel 18 has a pair of opposed sides 18a, 18b and a pair of opposed ends 18c, 18d, the back inner liner panel side 18a being contiguous to the back panel side 14b, the sides 14b, 18a, in fact defining a foldline 14b, 18a. The blank 10 additionally includes a pair of glue flaps 20, each of the glue flaps 20 having a pair of opposed sides 20a, 20b and a pair of opposed ends 20c, 20d, the glue flap sides 20b being contiguous to respective opposed front panel sides 12a, 12b.

Figure 6:
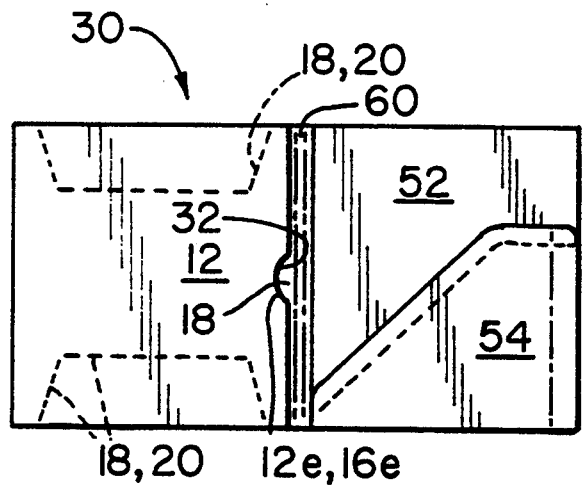

The front panel 12, the back panel 14, and the front inner liner panel 16 are of generally the same configuration and dimensions. Generally these panels 12, 14, 16 are rectangular (preferably square) and of slightly larger dimensions than the compact disc to be received in the jacket made from the blank 10. As best seen in FIG. 6, when the panels 12, 14, 16, 18 and glue flaps 20 are appropriately folded relative to one another, and the glue flaps 20 are glued to the back panel 14, the back inner liner panel 18 and the pair of glue flaps 20 are cooperatively configured and dimensioned to define a composite back inner liner panel of generally the same configuration and dimensions as the other panels 12, 14, 16.

Figure 2:
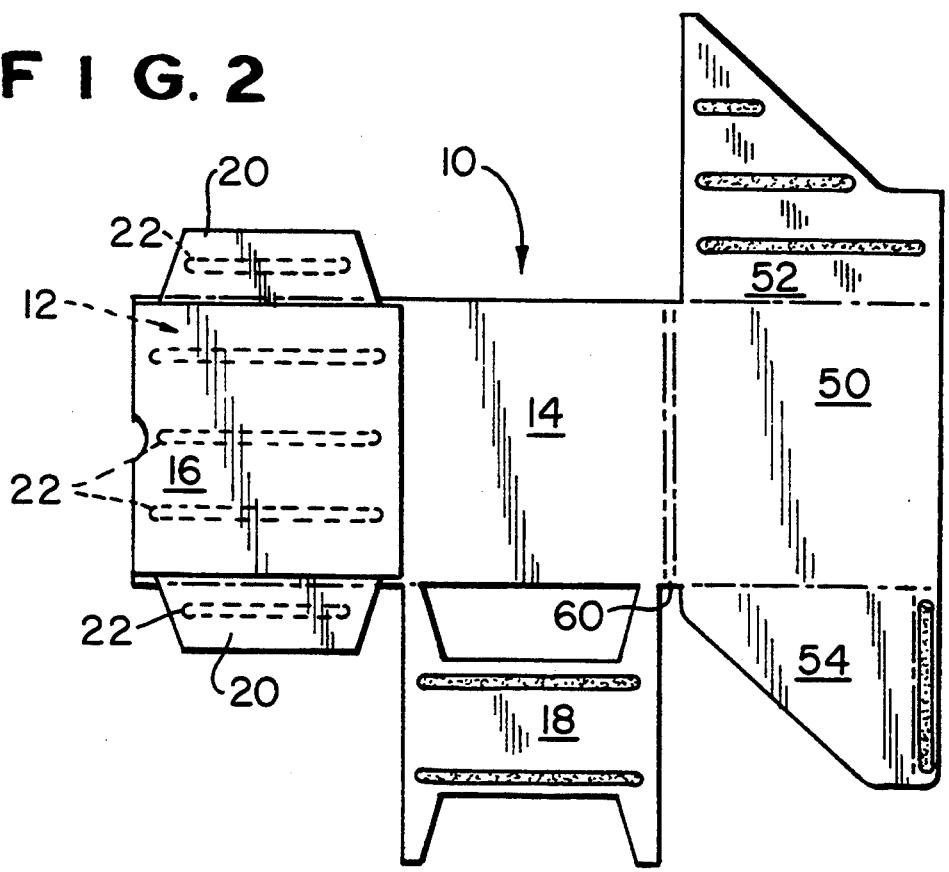
FIGS. 2–6 are front elevational views thereof in progressive stages of folding to form the fully folded jacket.

As the front inner liner panel 16 will be folded over and glued to the front panel 12 in the final product, as illustrated in FIG. 2, regions 22 of glue (for example, a hot-melt adhesive) are illustrated as three parallel stripes extending laterally across front panel 12, although the regions 22 may be located elsewhere on the front panel 12, and indeed on front inner liner panel 16 alternatively or in addition thereto. As the back inner liner panel 18 will be folded over the back panel 14 in the final product, a pair of regions 22 of glue (for example, a hot-melt adhesive) is illustrated extending laterally across back inner liner panel 18, although the regions 22 may be located elsewhere on the back inner liner panel 14, and indeed on back panel 14 alternatively or in addition thereto. As the glue flaps 20 will be folded over (but not glued to) the front panel 12 in the final product, and will be glued to the back panel 14 adjacent the sides 14a, 14b thereof in the final product, a region 22 of glue (for example, hot-melt adhesive) is illustrated as extending laterally across the reverse side of each glue flap 20, although the region 22 may be located elsewhere on the reverse side of the glue flaps 20, and alternatively or additionally on an appropriate surface of the rear panel 14 adjacent the sides 14a, 14b thereof.

Referring now to FIG. 2, therein illustrated is the blank 10 after the front inner liner panel 16 has been folded over the front panel 12 (along the foldline 12d, 16c in the direction of the arrow) and glued thereto.

Figure 3:
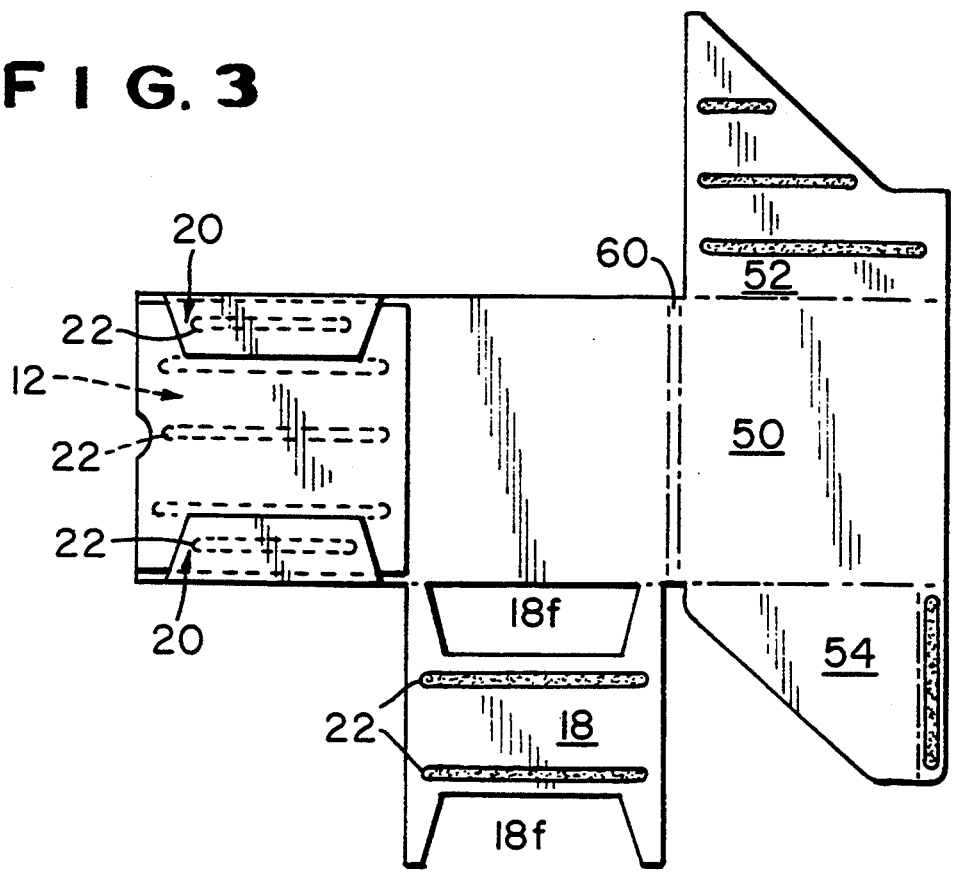

Referring now to FIG. 3, therein illustrated is the blank 10 after the glue flaps 20 have been folded over the front inner liner panel 16 (along foldlines 12a, 20b and 12b, 20b, in the direction of the arrows, respectively). At this point, the regions 22 of glue on glue flaps 20 are visible.

Figure 4:
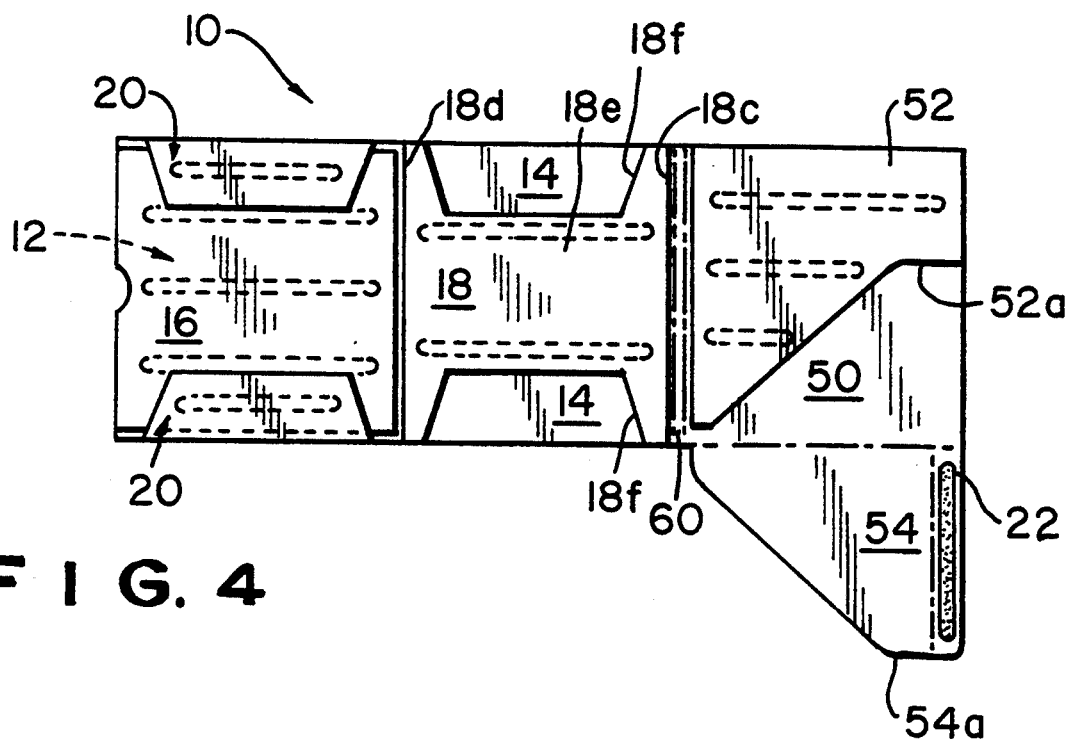

Referring now to FIG. 4, therein illustrated is the blank 10 after the back inner liner panel 18 has been folded over the back panel 14 (along the foldline 14b, 18a in the direction of the arrow) and glued thereto.

Figure 5:
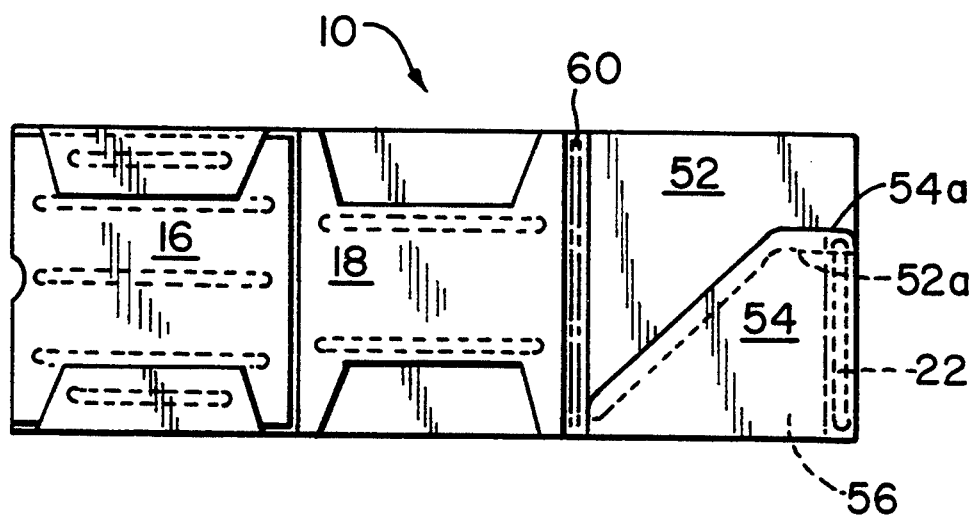
Figure 7:
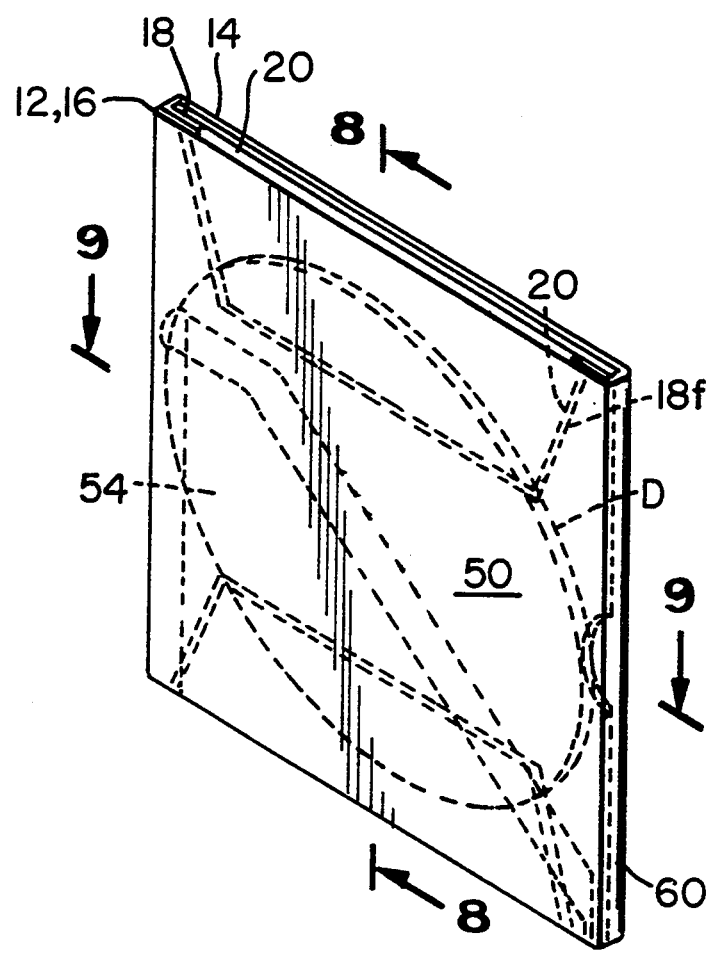
FIG. 7 is an isometric view of a fully folded jacket made from the blank by folding and gluing, with a compact disc being illustrated therein.
Figure 8:
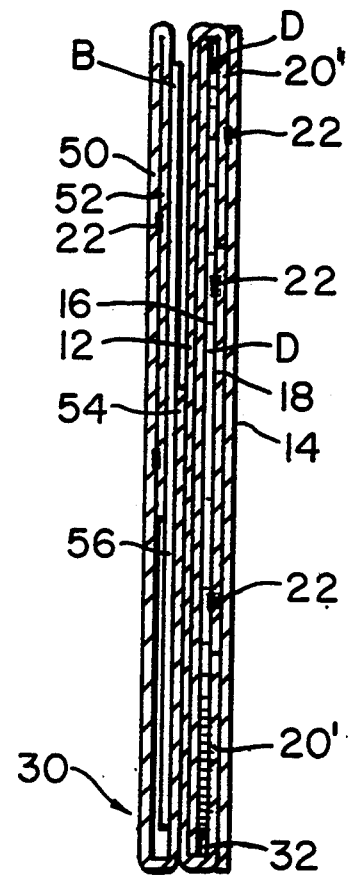
FIGS. 8 and 9 are sectional views taken along the lines 8—8 and 9—9, respectively, of FIG. 7.
Figure 9:
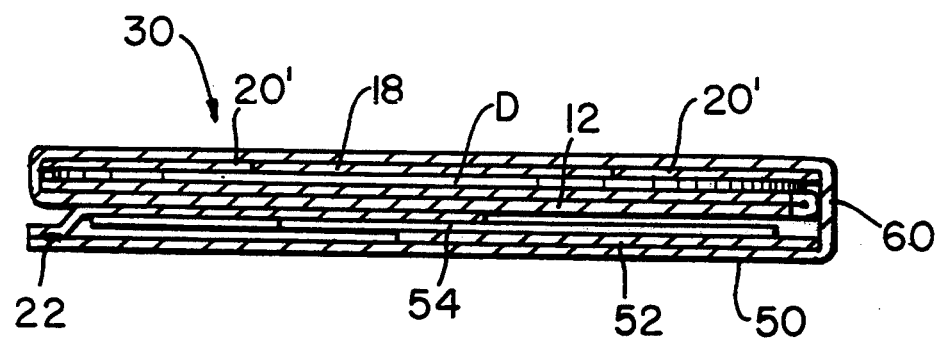

Temporarily skipping FIG. 5 and referring now to FIG. 6, therein illustrated is an open jacket 30 according to the present invention. The jacket 30 is made from the folded blank of FIG. 4 by folding the left portion of the blank as illustrated (containing front panel 12, front inner liner panel 16 and the glue flaps 20) over the center portion of the blank (containing back panel 14 and back inner liner panel 18) along the foldline 12c, 14d in the direction of the arrow. As illustrated in FIGS. 7-9, a compact disc D may be disposed within a hollow or chamber 32 defined by the jacket 30 intermediate the front inner liner panel 16 and the composite back inner liner panel defined by the back inner liner panel 18, the glue flaps 20 and optionally minor portions of the back panel 14. The sides of the jacket 30 are closed by the fold 12a, 20b between each of the glue flaps 20 and the front panel 12. One of the ends of the jacket 30 is closed by the fold 12c, 14d between the front and back panels 12, 14, and the other of the ends of the jacket 30 defines an aperture for passage of a compact disc D and the like therethrough into or from the chamber 32. It will be appreciated that each of the glue flaps 20 is glued to an adjacent face of the back panel 14 adjacent a respective opposite side 14a, 14b of the back inner liner panel 18. To this end, the back inner liner panel 18 has a portion of reduced width disposed intermediate the glue flaps 20.

In the first preferred embodiment illustrated in FIG. 1, the glue flaps 20 are trapezoidal in configuration, with the sides 20c, 20d thereof being of equal length. The back inner liner panel 18 has an "H" shape configuration with two parallel vertically extending bars formed by ends 18c, 18d and a single horizontally extending cross bar 183 (i.e., the portion of reduced width) joining bars 18c, 18d. The H-shaped configuration of the back inner liner panel 18 defines a pair of opposed cutouts 18f, one cutout being on one side thereof and adjacent one side 14b of the back panel, and the other cutout 18f being on the other side thereof. The cutouts 18f are configured and dimensioned to receive and be filled by the glue folds 20, as will become evident hereinafter. Thus the composite back inner liner panel is formed by the back inner liner panel 18 and the glue flaps 20 which fit into and fill cutouts 18f thereof. As a result, the composite back inner liner panel of the jacket 30 totally covers the adjacent surface of the back panel 14. This produces a jacket which is 100% double-walled so that both surfaces of the compact disc D therewithin are fully protected by double walls.

As the jacket 30 is made exclusively of paperboard, it is inexpensive, 100% recyclable, lightweight, and safely mailable without cushioning, while at the same time providing a desirable thickness and stiffness resulting from its 100% double-walled thickness on each side.

Referring back to FIG. 1, the blank 10 is of unitary, one-piece, integral construction—in other words, a single sheet of paperboard cut to the desired shape. The blank 10 is typically mill coated for printing (typically with clay and binders in order to provide fine printability) on only one face thereof—namely, the face hidden in FIG. 1. The blank may, of course, also be printed, and, if printed, may also contain a press-applied coating of varnish or aqueous latex disposed over the print in order to seal in the ink layer. Accordingly, in the finished product, all of the exterior surfaces of the jacket 30 and substantially all interior surfaces of the chamber 32 are coated. The only interior surfaces of the chamber 32 which are not coated are those defined by the glue flaps 20. All of the normally visible surfaces of the jacket 32 (including any portions of the interior thereof normally visible during the insertion and removal process) are coated—i.e., either mill coated or mill coated, printed and press coated. As the interior surfaces of the chamber 32 which have been coated are less "aggressive" or scratchy to the compact disc, presumably this arrangement minimizes wear of the compact disc as it is repeatedly inserted into and removed from the jacket 30.

Referring now to FIG. 6, it will be appreciated that the compact disc D can be easily slid into or out of the chamber 32 of jacket 30 without fear of the compact disc becoming hung up on the glue flaps 20 (that is, without the glue flaps blocking insertion of the compact disc into the chamber 32) since the glue flaps 20 and the back inner liner panel 18 are in the same plane, as best seen in FIGS. 8 and 9. Thus the various intersection lines 18, 20 illustrated in FIG. 6 present no impediment to the insertion of the compact disc D into the chamber 32 because the elements 18 and 20 are disposed within the same plane.

In order to facilitate removal of the compact disc D from the chamber 32, cutaways 12e, 16e on the ends 12d, 16c of the front panel 12 and front liner panel 16, respectively, as illustrated in FIG. 1, define a cutaway 12e, 16e in the jacket 30, as illustrated in FIG. 6.

Precisely because the back inner liner panel 18 is secured to the back panel 14 at a lateral side thereof defining a lateral foldline, as opposed to a transverse end thereof, it is possible to provide the jacket 30 with an additional panel adapted to hold a booklet, printed matter or a like generally flat object. Accordingly, referring now to FIG. 1, therein illustrated is an additional panel 50 contiguous to the free end of 14c (and not secured to the front panel 12). The additional panel 50 has a pair of opposed side panels 50a, 50b and a pair of opposed ends 50c, 50d. The additional panel 50 is of generally the same configuration and dimensions as the front panel 12, back panel 14, front inner liner panel 16, and composite back inner liner panel 18, 20. The blank 10 additionally includes a pair of extension flaps 52, 54 for the additional panel 50, each of the extension flaps 52, 54 being contiguous to an opposed side 50a, 50b, respectively, of the additional panel 50. The extension flap 52 defines a pair of opposed sides 52a, 52b and a pair of opposed ends 52c, 52d, while the extension flap 54 defines a pair of opposed sides 54a, 54b and a pair of opposed ends 54c, 54d. Each of the extension flaps 52, 54 contains regions of glue 22.

Referring now to FIG. 4, therein illustrated is blank 10 after the extension flap 52 has been folded over the additional panel 50 (along the foldline 50a, 52b in the direction of the arrow) and glued thereto. Referring now to FIG. 5, therein illustrated is the blank 10 after the extension flap 54 has been folded over the front panel 12 (along the fold line 50b, 54b in the direction of the arrow) and glued thereto. There is some overlap of the extension panel 54 over a marginal side portion of the extension flap 52, and the overlap of the extension panels 52, 54 leads into a pocket 56 suited to receive an insert or booklet B or the like. A portion of the glue line on extension flap 54 is optionally secured to the extension flap 52. When the extension flaps 52, 54 are appropriately folded and secured relative to one another, they form a composite extension panel 52, 54 which is of generally the same configuration and dimensions as the front panel 12, back panel 14, front inner liner panel 16, composite back inner panel 18, 20 and additional panel 50. The additional panel 50 and the composite extension panel 52, 54 are cooperatively configured and dimensioned to releasably receive the insert or booklet B.

In order to facilitate the additional panel 50 (and the composite extension panel 52, 54) extending from the rear panel 14 over the composite back inner liner panel 18, 20, the front inner liner panel 16 and the front panel 12, preferably a strip 60 is provided intermediate the back panel 14 and additional panel 50, connecting the adjacent panel ends 14c, 50d. The strip 60 is bordered by a foldline at each end thereof coincident with a panel end 14c, 50d, so that the strip 60 forms a spine of the fully folded jacket 30.

It has already been noted that there are segments of the purchasing public which, notwithstanding assurances to the contrary, believe that an uncoated paperboard surface is too aggressive for a compact disc and that the compact disc must be protected from any contact with such an uncoated surface. This segment of the purchasing public will find the embodiment of FIGS. 1–9 unacceptable, as the compact disc D can come into contact with the uncoated surface of the glue flaps 20 defining a part of the interior surface of the chamber 32. Accordingly, a second embodiment of the present invention is provided wherein the totality of the interior surface of the chamber 32 is defined by coated paperboard surface only.

Figure 10:
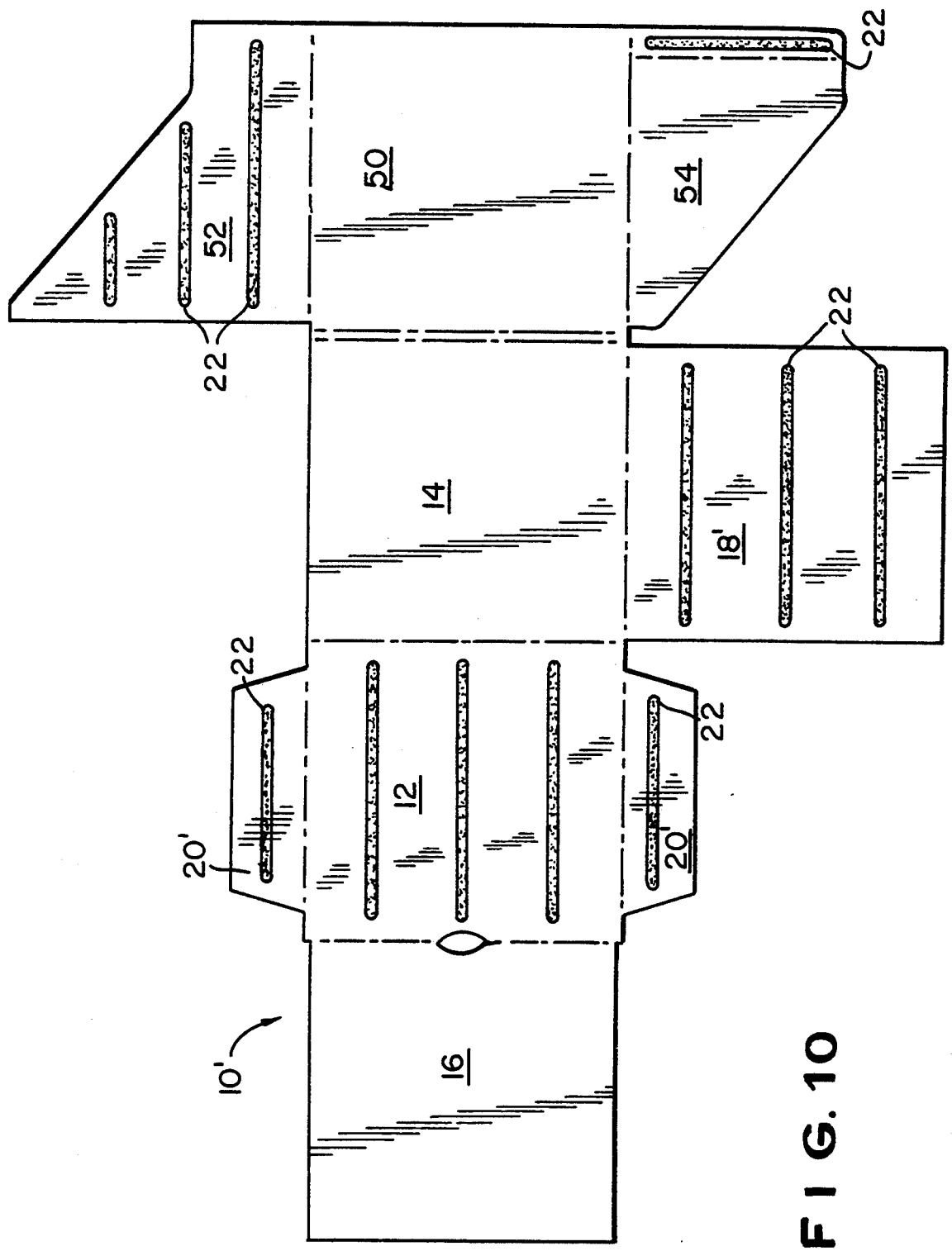
FIG. 10 is a front elevation view of a blank according to a second embodiment of the present invention.

Referring now to FIG. 10, therein illustrated is a blank 10' according to the second embodiment of the present invention. In the second embodiment, all elements having the identical structure and function are defined by the same numeral as in the first embodiment, while elements differing in structure or function are defined by the same numeral primed. The blank 10' of the second embodiment differs from the blank 10 of the first embodiment in that the back inner liner panel 18' is of the same configuration and shape as the panels 12, 14, 16, 50. The glue flaps 20' of the second embodiment 10' are of the same structure as the glue flaps 20 of the first embodiment, but differ in function in that they are not secured to the same face of the back panel 14 as the back inner liner panel 18', but rather to the opposite face. To this end, the glue portions 22 are relocated from the back of the glue flaps 20 to the front of the glue flaps 20'.

Figure 11:
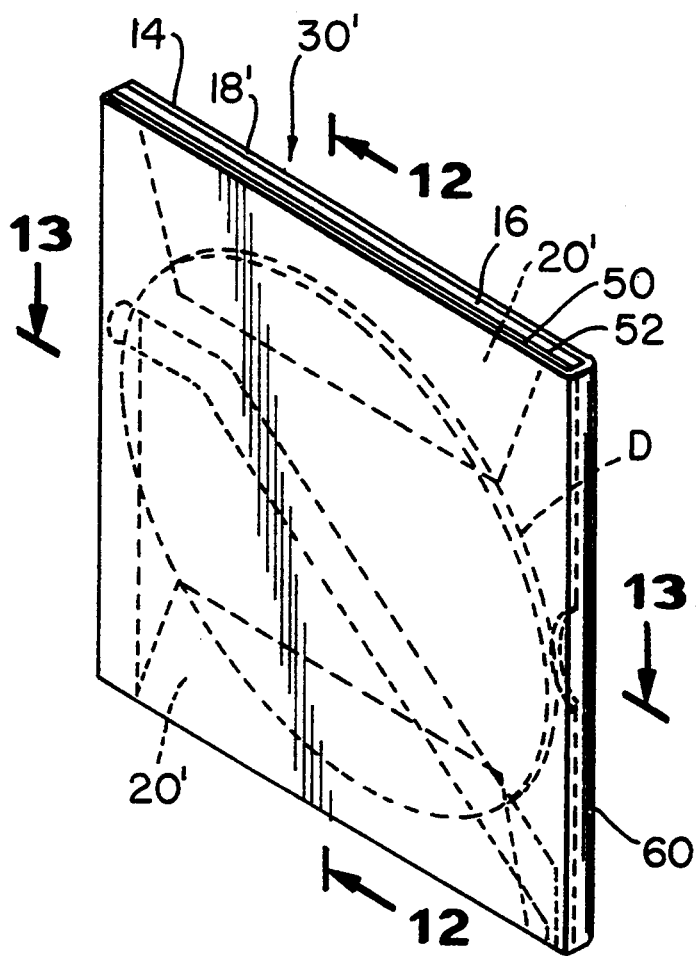
FIGS. 11–13 are views similar to FIGS. 7–9, but of the second embodiment.
Figure 12:
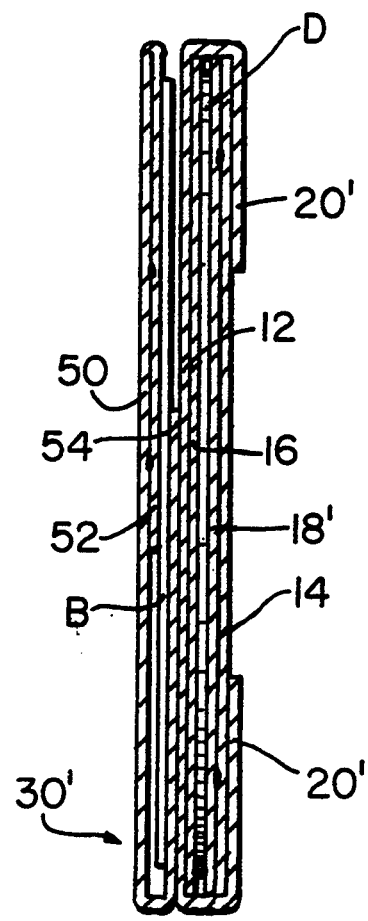
Figure 13:
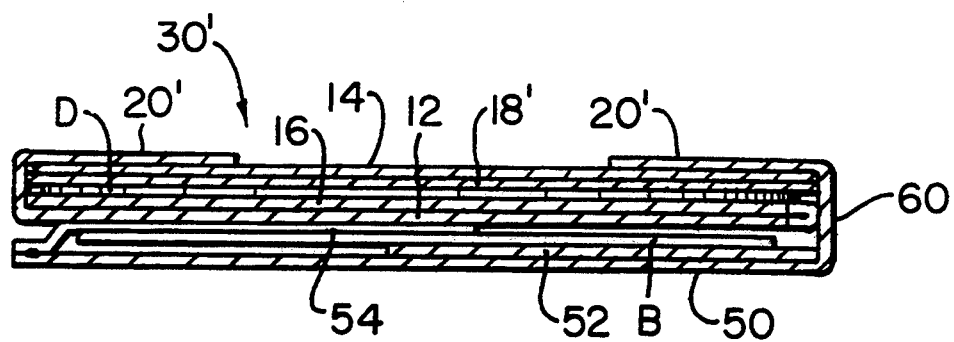

Referring now to FIGS. 11–13, in a fully folded jacket 30' according to the second embodiment of the present invention, the glue flaps 20' are visible to the user from the outside of the fully folded jacket and thus may be aesthetically unattractive. Additionally, since the presence of the glue flaps 20' creates an uneven back surface for the fully folded jacket 30', there may be certain difficulties when one tries to squeeze a jacket of the second embodiment into a tight series of similar jackets. Nonetheless the second embodiment will be attractive to those seeking to protect CD surfaces from contact with uncoated paperboard surfaces.

Thus, whereas the first embodiment of the jacket (in addition to including an additional panel for releasably receiving a booklet or insert) provides the CD-receiving compartment with an interior surface which is substantially, but not completely, a non-aggressive, coated paperboard surface, the second embodiment provides that the entirety of the CD-receiving compartment with an interior surface which is defined exclusively by a non-aggressive, coated paperboard surface.

To summarize, the present invention provides a jacket for compact discs and the like which is substantially double-walled throughout for stiffness and yet presents a chamber substantially or completely with an essentially smooth and non-aggressive interior in order to avoid hang-up or scratching of a compact disc therein during the insertion or removal process. The jacket is 100% recyclable, inexpensive, lightweight, mailable without cushioning, and printable on its exterior surfaces. An additional panel is provided for receiving a booklet or insert therein. The present invention furthermore provides a paperboard blank, which is coated on only one side thereof, from which such a jacket may be made.

Now that the preferred embodiments of the present embodiment have been shown and described in detail, various modifications and improvements thereon will become readily apparent to those skilled in the art. Accordingly, the spirit and scope of the present invention is to be construed broadly and limited only by the appended claims, and not by the foregoing specification.

We claim:

1. A paperboard blank for a double-walled jacket for a compact disc, comprising:
   (A) a front panel having a pair of opposed sides and a pair of opposed ends;
   (B) a back panel having a pair of opposed sides and a pair of opposed ends, one of said front panel ends being contiguous to one of said back panel ends;
   (C) a front inner liner panel contiguous to the other of said opposed ends of said front panel;
   (D) a back inner liner panel contiguous to one of said opposed sides of said back panel; and
   (E) a pair of glue flaps, each of said glue flaps being contiguous to an opposed side of said front panel;
   said front, back and front inner liner panels being of generally the same configuration and dimensions, and said back inner liner panel and said pair of glue flaps being cooperatively configured and dimensioned to define a composite back inner liner panel of generally the same configuration and dimensions as the other panels when said panels and glue flaps are appropriately folded relative to one another and said glue flaps are glued to said back panel.

2. The blank of claim 1 wherein said blank is coated for printing on only one face thereof.

3. The blank of claim 1 wherein said back inner liner panel has an H-shaped configuration defining a pair of opposed cutouts, one cutout being on one side thereof and adjacent said one side of said back panel and the other cutout being on the other side thereof.

4. The blank of claim 1 including an additional panel contiguous to the other of said opposed ends of said back panel and having a pair of opposed sides and a pair of opposed ends.

5. The blank of claim 4 further comprising a pair of extension flaps for said additional panel, each of said extension flaps being contiguous to an opposed side of said additional panel and, when said extension flaps are appropriately folded and secured relative to one another, forming a composite extension panel, each of said composite extension panel and said additional panel being of generally the same configuration and dimensions as said front, back and front inner panel.

6. The blank of claim 5 wherein said additional panel and said composite extension panel are cooperatively configured and dimensioned to releasably receive an insert.

7. A paperboard blank for a double-walled jacket for a compact disc, comprising:
   (A) a front panel having a pair of opposed sides and a pair of opposed ends;
   (B) a back panel having a pair of opposed sides and a pair of opposed ends, one of said front panel ends being contiguous to on one of said back panel ends;
   (C) a front inner liner panel contiguous to the other of said opposed ends of said front panel;
   (D) a back inner liner panel contiguous to the one of said opposed sides of said back panel and having an H-shaped configuration defining a pair of opposed cutouts, one cutout being on one side thereof and adjacent said one side of said back panel and the other cutout being on the other side thereof; and
   (E) a pair of glue flaps, each of said glue flaps being contiguous to an opposed side of said front panel;
   said front, back and front inner liner panels being of generally the same configuration and dimensions, and said back inner liner panel and said pair of glue flaps being cooperatively configured and dimensioned to define a composite back inner liner panel of generally the same configuration and dimensions as the other panels when said panels and glue flaps are appropriately folded relative to one another and said glue flaps are glued to said back panel;
   said blank being coated for printing on only one face thereof.

8. The blank of claim 7 further including
   (F) an additional panel contiguous to the other of said opposed ends of said back panel and having a pair of opposed sides and a pair of opposed ends; and
   (G) a pair of extension flaps for said additional panel, each of said extension flaps being contiguous to an opposed side of said additional panel and, when said extension flaps are appropriately folded and secured relative to one another, forming a composite extension panel, each of said composite extension panel and said additional panel being of generally the same configuration and dimensions as said front, back and front inner panel, said additional panel and said composite extension panel being cooperatively configured and dimensioned to releasably receive an insert.

9. A double-walled paperboard jacket for a compact disc, comprising:
   (A) a front panel having a pair of opposed sides and a pair of opposed ends;
   (B) a back panel having a pair of opposed sides and a pair of opposed ends, one of said front panel ends being contiguous to and folded relative to one of said back panel ends;
   (C) a front inner liner panel contiguous to and folded relative to the other of said opposed ends of said front panel;
   (D) a back inner liner panel contiguous to and folded relative to one of said opposed sides of said back panel; and
   (E) a pair of glue flaps, each of said glue flaps being contiguous to and folded relative to an opposed side of said front panel, and each of said glue flaps being glued to said back panel;
   said front, back and front inner liner panels being of generally the same configuration and dimensions, and said back inner liner panel and said pair of glue flaps being cooperatively configured and dimensioned to define a composite back inner liner panel of generally the same configuration and dimensions as the other panels.

10. The jacket of claim 9 including an additional panel contiguous to the other of said opposed ends of said back panel and having a pair of opposed sides and a pair of opposed ends.

11. The jacket of claim 10 further comprising a pair of extension flaps for said additional panel, each of said extension flaps being contiguous to an opposed side of said additional panel and together forming a composite extension panel, each of said composite extension panel and said additional panel being of generally the same configuration and dimensions as said front, back and front inner panel, said additional panel and said composite extension panel being cooperatively configured and dimensioned to releasably receive an insert.

12. The jacket of claim 11 wherein said jacket is formed substantially exclusively of paperboard.

13. The jacket of claim 11 wherein said jacket defines a chamber intermediate said front inner liner panel and said composite back inner liner panel.

14. The jacket of claim 13 wherein the sides of said jacket are closed by the fold between each of said glue flaps and said front panel, one of the ends of said jacket is closed by the fold between said front and back panels, and the other of the ends of said jacket defines an aperture for passage of a compact disc therethrough into or from said chamber.

15. The jacket of claim 11 wherein each of said panels defines a pair of opposed faces, one face of said front inner liner panel being glued to an adjacent face of said front panel, and one face of said back inner liner panel being glued to an adjacent face of said back panel.

16. The jacket of claim 15 wherein said back inner liner panel has an H-shaped configuration defining a pair of opposed cutouts, one cutout being on one side thereof and adjacent said one side of said back panel and the other cutout being on the other side thereof.

17. The jacket of claim 16 wherein each of said glue flaps is glued to said adjacent face of said back panel through a respective cutout of said back inner liner panel.

18. The jacket of claim 11 wherein said jacket is double-walled substantially throughout.

19. The jacket of claim 11 wherein said jacket defines a chamber intermediate said front inner liner panel and said composite back inner liner panel and is formed from a paperboard blank coated on only one surface thereof, and all exterior surfaces of said jacket and substantially all interior surfaces of said chamber are coated.

20. The jacket of claim 19 wherein the interior surfaces of said chamber defined by said front panel and said back inner liner panel are coated.

21. The jacket of claim 11 wherein all of said panels and glue flaps are together of one-piece, unitary, integral construction.

22. A double-walled paperboard jacket for a compact disc, comprising:
(A) a front panel having a pair of opposed faces, a pair of opposed sides, and a pair of opposed ends;
(B) a back panel having a pair of opposed faces, a pair of opposed sides, and a pair of opposed ends, one of said front panel ends being contiguous to and folded relative to one of said back panel ends;
(C) a front inner liner panel having a pair of opposed faces, contiguous to and folded relative to the other of said opposed ends of said front panel;
(D) a back inner liner panel having a pair of opposed faces, contiguous to and folded relative to one of said opposed sides of said back panel, said back inner liner panel having an H-shaped configuration defining a pair of opposed cutouts, one cutout being on one side thereof and adjacent said one side of said back panel and the other cutout being on the other side thereof; and
(E) a pair of glue flaps, each of said glue flaps being contiguous to and folded relative to an opposed side of said front panel, and each of said glue flaps being glued to said back panel;
said front, back and front inner liner panels being of generally the same configuration and dimensions, and said back inner liner panel and said pair or glue flaps being cooperatively configured and dimensioned to define a composite back inner liner panel of generally the same configuration and dimensions as the other panels;
said jacket being formed substantially exclusively of paperboard and defining a chamber intermediate said front inner liner panel and said composite back inner liner panel; the sides of said jacket being closed by the fold between each of said glue flaps and said front panel, one of the ends of said jacket being closed by the fold between said front and back panels, and the other of the ends of said jacket defining an aperture for passage of a compact disc and the like therethrough into or from said chamber; one face of said front inner liner panel being glued to an adjacent face of said front panel, and one face of said back inner liner panel being glued to an adjacent face of said back panel, each of said glue flaps being glued to said adjacent face of said back panel on an opposite side of said back inner liner panel through a respective one of said cutouts;
said jacket being double-walled substantially throughout and formed from a paperboard blank coated on only one surface thereof, all exterior surfaces of said jacket and substantially all interior surfaces of said chamber being coated;
all of said panels and glue flaps being together of one-piece, unitary, integral construction.

23. The jacket of claim 22 further including
(F) an additional panel contiguous to the other of said opposed ends of said back panel and having a pair of opposed sides and a pair of opposed ends; and
(G) a pair of extension flaps for said additional panel, each of said extension flaps being contiguous to an opposed side of said additional panel and appropriately folded and secured relative to one another to form a composite extension panel, each of said composite extension panel and said additional panel being of generally the same configuration and dimensions as said front, back and front inner panel, said additional panel and said composite extension panel being cooperatively configured and dimensioned to releasably receive an insert.

24. A double-walled paperboard jacket for a compact disc, comprising:
(A) a front panel having a pair of opposed sides and a pair of opposed ends;
(B) a back panel having a pair of opposed sides, a pair of opposed ends and a pair of opposed faces, one of said front panel ends being contiguous to and folded relative to one of said back panel ends;
(C) a front inner liner panel contiguous to and folded relative to the other of said opposed ends of said front panel;
(D) a back inner liner panel contiguous to and folded relative to one of said opposed sides of said back panel;

(E) a pair of glue flaps, each of said glue flaps being contiguous to and folded relative to an opposed side of said front panel, and each of said glue flaps being glued to said back panel to define a chamber intermediate said front inner liner and said back inner liner adapted to receive a CD;

(F) an additional panel contiguous to the other of said opposed ends of said back panel and having a pair of opposed sides and a pair of opposed ends; and (G) a pair of extension flaps for said additional panel, each of said extension flaps being contiguous to an opposed side of said additional panel and appropriately folded and secured relative to one another to form a composite extension panel, each of said composite extension panel and said additional panel being of generally the same configuration and dimensions as said front, back and front inner panel, said additional panel and said composite extension panel being cooperatively configured and dimensioned to releasably receive an insert;

said front, back, front inner liner and back inner liner panels being of generally the same configuration and dimensions, and said back panel having said glue panels on one of said opposed faces thereof and said back inner liner panel of the other of said opposed faces.

25. The jacket of claim 24 wherein said jacket is formed substantially exclusively of paperboard.

26. The jacket of claim 24 wherein said jacket defines a chamber intermediate said front inner liner panel and said back inner liner panel.

27. The jacket of claim 26 wherein the sides of said jacket are closed by the fold between each of said glue flaps and said front panel, one of the ends of said jacket is closed by the fold between said front and back panels, and the other of the ends of said jacket defines an aperture for passage of a compact disc therethrough into or from said chamber.

28. The jacket of claim 24 wherein each of said panels defines a pair of opposed faces, one face of said front inner liner panel being glued to an adjacent face of said front panel, one face of said back inner liner panel being glued to an adjacent face of said back panel, said glue flaps being glued to the other face of said back panel.

29. The jacket of claim 24 wherein said jacket is double-walled substantially throughout.

30. The jacket of claim 24 wherein said jacket is formed from a paperboard blank coated on only one surface thereof, and all exterior surfaces of said jacket and all interior surfaces of said chamber are coated.

31. The jacket of claim 30 wherein all of said panels and glue flaps are together of one-piece, unitary, integral construction.

32. A double-walled paperboard jacket for a compact disc, comprising:

(A) a front panel having a pair of opposed faces, a pair of opposed sides, and a pair of opposed ends;

(B) a back panel having a pair of opposed faces, a pair of opposed sides, and a pair of opposed ends, one of said front panel ends being contiguous to and folded relative to one of said back panel ends;

(C) a front inner liner panel having a pair of opposed faces, contiguous to and folded relative to the other of said opposed ends of said front panel;

(D) a back inner liner panel having a pair of opposed faces, contiguous to and folded relative to one of said opposed sides of said back panel; and (E) a pair of glue flaps, each of said glue flaps being contiguous to and folded relative to an opposed side of said front panel, and each of said glue flaps being glued to said back panel to define a chamber intermediate said front inner liner and said back inner liner adapted to receive a compact disc;

(F) an additional panel contiguous to the other of said opposed ends of said back panel and having a pair of opposed sides and a pair of opposed ends; and (G) a pair of extension flaps for said additional panel, each of said extension flaps being contiguous to an opposed side of said additional panel and appropriately folded and secured relative to one another to form a composite extension panel, each of said composite extension panel and said additional panel being of generally the same configuration and dimensions as said front, back and front inner panel, said additional panel and said composite extension panel being cooperatively configured and dimensioned to releasably receive an insert;

said front, back, front inner liner and back inner liner panels being of generally the same configuration and dimensions, and said back panel having said glue panels on one of said opposed faces thereof and said back inner liner panel of the other of said opposed faces;

said jacket being formed substantially exclusively of paperboard and defining a chamber intermediate said front inner liner panel and said back inner liner panel; the sides of said jacket being closed by the fold between each of said glue flaps and said front panel, one of the ends of said jacket being closed by the fold between said front and back panels, and the other of the ends of said jacket defining an aperture for passage of a compact disc therethrough into or from said chamber; one face of said front inner liner panel being glued to an adjacent face of said front panel, and one face of said back inner liner panel being glued to an adjacent face of said back panel, each of said glue flaps being glued to the other face of said back panel on an opposite side of said back panel;

said jacket being double-walled substantially throughout and formed from a paperboard blank coated on only one surface thereof, all exterior surfaces of said jacket and all interior surfaces of said chamber being coated;

all of said panels and glue flaps being together of one-piece, unitary, integral construction.

* * * * *